United States Patent [19]

Fisher

[11] 4,403,765
[45] Sep. 13, 1983

[54] MAGNETIC FLUX-SHIFTING FLUID VALVE

[75] Inventor: Richard T. Fisher, Pembroke, Mass.

[73] Assignee: John F. Taplin, Newton, Mass.

[21] Appl. No.: 264,365

[22] Filed: May 18, 1981

Related U.S. Application Data

[63] Continuation of Ser. No. 97,079, Nov. 23, 1979, abandoned.

[51] Int. Cl.$^3$ .......................... F16K 31/08; H01F 3/12
[52] U.S. Cl. ...................................... 251/65; 251/129; 251/139; 137/625.65; 335/236; 335/266
[58] Field of Search ................. 251/141, 129, 65, 139; 137/625.65; 335/230, 236, 266

[56] References Cited

U.S. PATENT DOCUMENTS

| | | | |
|---|---|---|---|
| 3,203,447 | 8/1965 | Bremner et al. | 251/65 X |
| 3,368,788 | 2/1968 | Padula | 251/141 X |
| 3,379,214 | 4/1968 | Weinberg | 251/141 X |
| 3,809,123 | 5/1974 | Heimann | 251/141 X |
| 3,814,376 | 6/1974 | Reinicke | 251/141 X |

*Primary Examiner*—Arnold Rosenthal

[57] ABSTRACT

A magnetic flux-shifting or magnetic latch valve includes a first flux path including a first permanent magnet having a large coercive force so that its polarity cannot readily be altered. It further includes a second flux path including a second permanent magnet having a small coercive force so that its polarity can be altered. A valve according to this invention further includes a d-c source and a winding energized by said d-c source for altering the polarity of said second magnet.

The fluid valve includes a valve element and a valve seat cooperating with the valve element. The valve has two limit positions, i.e. fully open and fully closed. In the fully closed position the pole surfaces of magnetic flux paths have the same magnetic polarity and hence do not attract each other permitting gravity, spring or hydrostatic means to form a gap therebetween. However, in the fully open position the pole surfaces of the magnetic flux paths have opposite magnetic polarities and hence attract each other, closing the aforementioned gap. To put it in other words, in the fully open position of the valve, the two magnets of the valve establish two parallel flux paths, while in the closed position of the valve the magnetic flux paths of both magnets are in series.

The above structure makes it possible to operate the valve by mere d-c pulses, thus distinguishing from flux-shift valves that require sustained currents for maintaining the valve in one of its limit positions.

17 Claims, 2 Drawing Figures

MAGNETIC FLUX-SHIFTING FLUID VALVE

This application is a continuation of application Ser. No. 97,079, filed Nov. 23, 1979 and now abandoned.

BACKGROUND OF THE INVENTION AND PRIOR ART

This invention relates to magnetic flux-shifting fluid valves. In valves of this description the shifting of a magnetic flux causes the movable valve element to move from one of its limit positions to the other of its limit positions.

The oldest type of magnetic flux-shifting fluid valves called for two magnetizing windings to effect required flux-shift and were bulky for this reason.

A flux-shifting fluid valve was suggested that required but one magnetizing winding, and furthermore had the advantage that moving the valve element from one of its limit positions to the other of its limit positions was effected by a magnetic pulse, and the valve element was thereafter held in its respective limit position by the latching action of a permanent magnet. This magnetic flux-shifting valve suffered, however, from the drawback of being unstable, i.e. mechanical vibrations or shock moved the valve element toward the permanent magnet and caused the valve element to stay close to the permanent magnet, while it was supposed to stay in a position remote from the permanent magnet.

An improvement of the above referred-to magnetic flux-shifting valve was suggested in U.S. Pat. No. 3,458,769; July 29, 1967 to Harald Stampfli for "ELECTRICALLY CONTROLLED VALVE". To move the valve element upwardly, Stampfli applies a first d-c magnet winding having just sufficient ampere-turns to attract the valve element, or plunger, and magnetize the permanent magnet enough to hold the plunger, after removal of the attracting ampere-turns of the first magnet winding. A second d-c pulse in the same magnet coil is needed to get the permanent magnet sufficiently strong to keep the valve element safe in position. Releasing the plunger and/or avoidance of false closure is effected by demagnetizing the permanent magnet. This is accomplished by applying by means of an additional magnet winding ampere-turns of opposite direction, or opposite polarity, and of such lesser magnitude as to make it impossible to attract the armature, or plunger, and/or to remagnetize the permanent magnet in opposite polarity.

Stampfli thus discloses a magnetic flux-shifting valve that is potentially free from susceptibility to failure by mechanical shock, vibrations, and pressure transients at the price of introducing a susceptibility to failure when electrical parameters vary.

Other pertinent prior art is disclosed in U.S. Pat. Nos. 3,203,447; Aug. 31, 1965 to W. C. Bremer et al for "MAGNETICALLY OPERATED VALVE" and in 3,368,788; Feb. 13, 1968 to L. D. Padula for "MAGNETIC LATCH VALVE".

The first mentioned valve shows an over center toggle response which is the result of a movable permanently magnetized armature, or plunger, system whose limit positions couple attractively to either of two sections of an electromagnet with two equal limbs forming separate flux return paths, of which either one can complete the circuit if the armature is brought close thereto. This design can be made to work efficiently, but if a shock or transient fluid pressure peak in the absence of any holding current in the coil accidentally moves the armature or plunger to the opposite limit position, or even past center in that direction, the armature will then proceed to and remain at the wrong limit position.

The second mentioned valve, no less than that of Stampfli, provides reasonably secure freedom from false positioning due to shock or transient pressures. It, however, achieves this as a result of providing two permanent magnetic elements, one operationally unalterable and the other remagnetized in opposite polarity each time the valve position is changed. These two magnetic elements are required to be "chosen so they both establish the same flux levels in their remanent states." It is this equality of flux levels which purports to eliminate any holding flux in the armature and working air gap under the operating conditions calling for armature release. While such an equality of two fluxes can be achieved experimentally, it is practically compromised in many ways, including, but not limited to, the following: manufacturing variations in the constituent magnetic properties of two totally different magnetic materials; dimensional variations in any part of the two magnetic circuits which include the said magnets, and particularly in any air gaps at joints; variations in temperature effects on the strength of the two different permanent magnets; the effect of stray magnetic fields or of proximate ferro-magnetic structures or machine parts, whose effect in modifying the field strengths of the two magnets may differ. If as a consequence of an accumulation of perturbation of the desired equality of flux levels some armature flux remains in the air gap, its attractive force will reduce the effectiveness of the return spring in returning the armature against the resistance either of fluid pressure or accidental friction. In extreme cases such undesired armature—air gap flux might even prevent release completely.

Besides the above susceptibility to operating difficulties, the structure of U.S. Pat. No. 3,368,788 has the further disadvantage of requiring for efficient operation a second coil surrounding the armature and air gap, in addition to the one for remagnetizing the appropriate permanent magnet.

Another prior art magnetic flux-shifting valve having two different positions to establish two different paths for the flow of fluid is disclosed in U.S. Pat. No. 3,379,214; Apr. 23, 1968 to R. W. Weinberg for PERMANENT MAGNET VALVE ASSEMBLY. This patent describes two types of valves which are of a different nature. Both types of valves require a very large amount of ampere turns for a change from one position to the other position. The type of valves disclosed in FIGS. 4-7 of the above patent includes a movable permanent magnet having a large coercive force and whose polarity is, therefore, virtually irreversible, requiring the entire movable magnet to be moved when opening or closing the valve. This structure of U.S. Pat. No. 3,379,214 calls for two valve seats and two valve stems, rather than a single valve seat and a single valve stem.

Objects of the present invention accordingly include the following:

1. To provide an improved magnetic latch valve;
2. To provide magnetic latch valves which are free from the disadvantages and/or drawbacks of the prior art latch valves;
3. To provide a flux-shifting fluid valve which, when inadvertently moved from a desired state to a second state, will not remain in the second state, but will spontaneously return to the desired state, even when operating current is absent from the flux shifting winding;

4. To achieve said freedom from inadvertent perturbability without requiring precise mechanical or magnetic dimensions or quantities;

5. To achieve the foregoing with only a single winding location;

6. To achieve magnetically efficient operation such that the valve may be operated with momentary current pulses or may be left energized for long periods with voltages at the high limits of any particular coil rating without undue temperature rise;

7. To provide an integral valve structure performing both the function of controlling the flow of fluids and of being operated magnetically by flux-shift rather than a composite valve comprising a magnetic drive for valve means controlling the flow of fluids;

3. To provide a valve that includes two permanent magnets, one having a relatively high coercive force and the other having a relatively low coercive force, and of changing the magnetization of the latter in such a way that the fluxes of the two magnets are either in series across the working air gap, or in parallel through a diverting shunt path, but that the permanent magnet having the relatively low coercive force is never left demagnetized.

Other objects and advantages of the invention will become apparent as this specification proceeds.

SUMMARY OF THE INVENTION

As is apparent from the above, the invention refers to a magnetic flux-shifting valve having two different positions to control the path for the flow of a fluid. The term to control the path for the flow of a fluid as used in this context is intended to cover the case where the flow of a fluid is entirely blocked in one, and is entirely free in the other position of the valve, as well as the case where the path of a fluid is switched from one position to another position.

The valve comprises a pair of relatively movable fluid-flow control parts including a valve element and a valve seat cooperating with said valve element.

It further includes means for biasing said vavle element away from said valve seat as, for instance, a spring.

It further includes a first fixed permanent magnet having a relatively large coercive force so that its polarity may hardly be changed, a first soft iron member is in physical engagement with one pole surface of said first magnet and a second soft iron member is in physical engagement with the other pole surface of said first magnet.

The valve further includes a pair of cooperating pole pieces of soft iron capable of forming a working gap therebetween. Said pair of pole pieces includes a movable pole piece and a fixed pole piece. Said valve element is integral with said movable pole piece and said valve seat is integral with said fixed pole piece.

The aforementioned first magnet establishes a first closed flux path in the first position of the flux-shifting valve. That first closed flux path includes one pole surface of said first magnet, said first soft iron member, said movable pole piece, said second soft iron member, and back to the other pole surface of said magnet.

The valve according to this invention further includes a tubular soft iron member defining jointly with said valve seat a fluid passageway. Said tubular member further forms said fixed pole piece on one of the ends thereof.

The valve according to this invention includes further a soft iron casing forming a cavity for housing a flux-shifting electromagnet. Said casing extends from the end of said tubular member opposite said fixed pole piece to said first magnet and said second soft iron member.

The valve according to this invention further includes a second fixed magnet having a small coercive force in comparison to said first magnet so that its polarity can relatively easily be reversed by reversing the direction of current flow in a cooperating electromagnet. Said second magnet establishes in said first position of said flux-shifting valve a second closed flux path separate from said first flux path except for the portion of said second flux path in said second soft iron member wherein the fluxes exist in parallel paths. Said second flux path includes one pole surface of said second magnet, a portion of said tubular member, one of said pair of pole pieces, said second soft iron member, said casing, another portion of said tubular member, and back to the pole surface of said second magnet.

The above referred-to casing receives an electromagnet for reversing the polarity of said second magnet to establish said second fluid control position of said flux-shifting valve. In said second fluid control position the fluxes of said first magnet and of said second magnet are in series and the single closed flux path of said first magnet and said second magnet includes a pole surface of said second magnet, a portion of said tubular member, said casing, said first magnet, said first soft iron member, said movable and said fixed pole pieces, another portion of said tubular member, and back to the other pole surface of said second magnet.

DESCRIPTION OF PREFERRED EMBODIMENT

Figure 1:
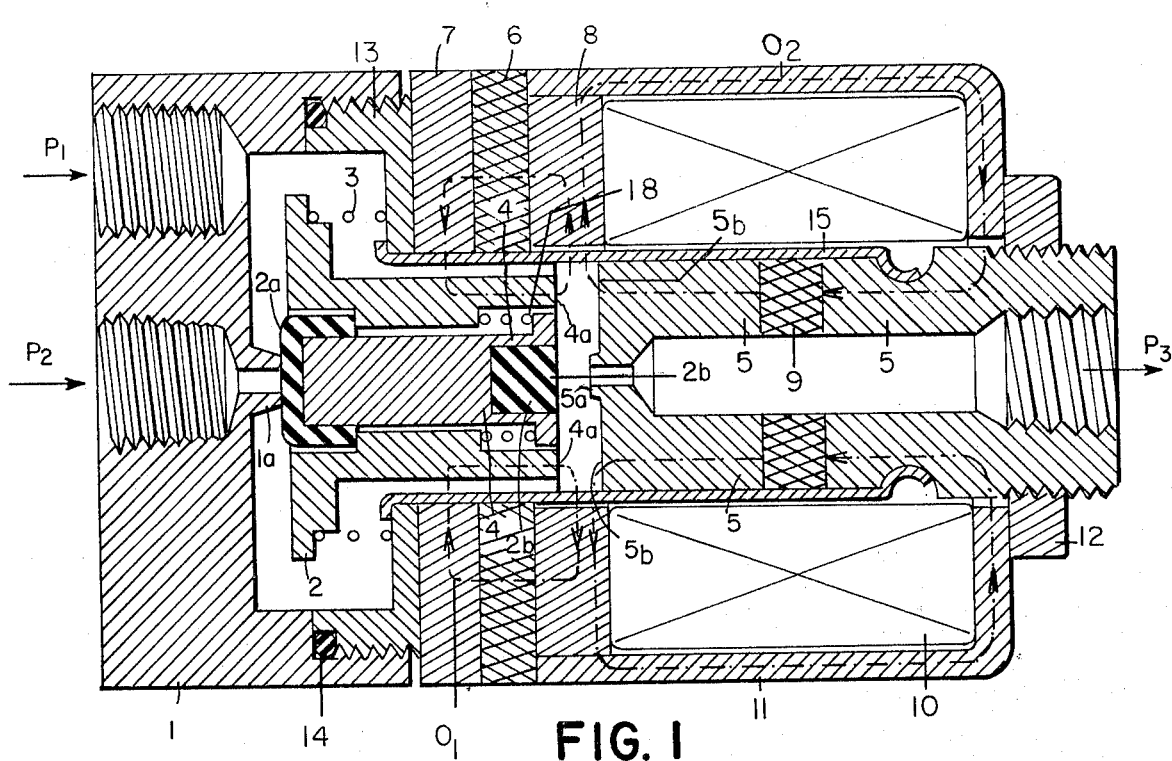
FIG. 1 is substantially a longitudinal section of a valve embodying the invention in one of its operating positions, i.e. its closed position.

Referring now to the drawings, numeral 1 has been applied to indicate the base of a three way valve having three ports $P_1, P_2, P_3$. Numeral 2 has been applied to indicate generally the plunger which is biased by spring 3 from right to left. Valve base 1 is provided with a valve seat 1a which cooperates with valve element 2a formed by the left side of plunger 2. Valve element 2a is of a resilient material as generally used for valve elements. The plunger 2 is substantially cylindrical and consists of soft iron to be readily magnetized. It forms the annular pole surface 4a. In the three way valve illustrated, plunger 2 has a filler member 4 and forms a second valve element 2b that cooperates with valve seat 5a formed by armature 5 of soft iron. In a two way valve according to the present invention, port $P_3$ would be permanently closed or absent, and valve element 2b, seat 5a and related parts could be omitted. A first fixed permanent annular magnet 6 having a relatively large coercive force is arranged around pole face a pole piece 4a in coaxial relation thereto. Parts 7 and 8 are soft iron pole shoes or soft iron members arranged to opposite end surfaces of permanent magnet 6 which end surfaces form its poles. Soft iron armature 5 forms a pole piece or pole surface 5b intended to cooperate with pole piece or pole surface 4a or part 2 as will be shown below in greater detail. Permanent magnet 6 has such a large coercive force that the polarity of pole surface 4a cannot be changed by any operation of the valve, i.e. it is permanently "north", or permanently "south".

Soft iron armature or tubular member 5 is formed of two separate parts 5 of which each is located to opposite sides of a second permanent magnet 9 which has a relatively low coercive force so that it can be magnetized in either direction by means of applying ampere turns in one or the other direction in electromagnet coil 10. Magnet coil 10 can be energized by a source of d-c current (not shown). This source can take various forms. It can, for instance, be a battery that can be connected in either polarity to coil or winding 10; or it can be a source producing single pulses of d-c current in either direction. Yet again it may be rectified AC. Or two or more winding sections may occupy the space assigned to coil 10, each selectively operated from different current sources providing desired ampere turns and polarity. Coil 10 is enclosed by a casing part or housing 11 which is of soft iron because it forms the path of a magnetic flux that crosses the pole piece 5b. In a three way valve parts 5,9,5 define a tubular passageway for a flow of fluid that flows out of the valve by exit port $P_3$. The right part of tubular member 5 is screw-threaded and clamped against housing 11 by means of a screw-threaded nut 12. A screw-threaded part 13 mates the screw threads in valve base 1. Part 13 is also sealed by means of "O" ring 14, or the like fluid seal. Helical spring 18 is interposed between parts 2 and 4, its purpose being to allow valve element 2b to seat against valve seat 5a, then yield sufficiently to allow plunger 2 to follow through until pole surface piece or pole 4a seats on pole surface piece or pole 5b. (Spring 18 and part 4 would not be needed in a two way valve.) Tubular member 15 engages with its right circularly bent end a groove in the right soft iron armature 5, and is thus (or alternatively by welding) tightly affixed to the latter. The left part of member 15 is welded, or otherwise integrally attached, to part 13. Parts 13,15 and 5 thus form a part of a conduit from the cavity above ports $P_1$ and $P_2$ to port $P_3$ when port $P_3$ is required. This conduit is closed by element 2b when the latter engages seat 5a, but a clear fluid passageway then exists between ports $P_1$ and $P_2$. When, on the other hand, element 2a closes seat 1a, fluid re-entering the aforementioned cavity from port $P_1$ is, in the three way arrangement, allowed to flow to the gap formed between pole surfaces or pole pieces 4a and 5b, and from there to the gap formed between valve element 2b and valve seat 5a, and from there through the fluid passageway formed by parts 5 and magnet 9 to exit port $P_3$. This has been shown in FIG. 1 showing valve seat 1a closed by valve element 2a and valve seat 5a opened by valve element 2b.

Figure 2:
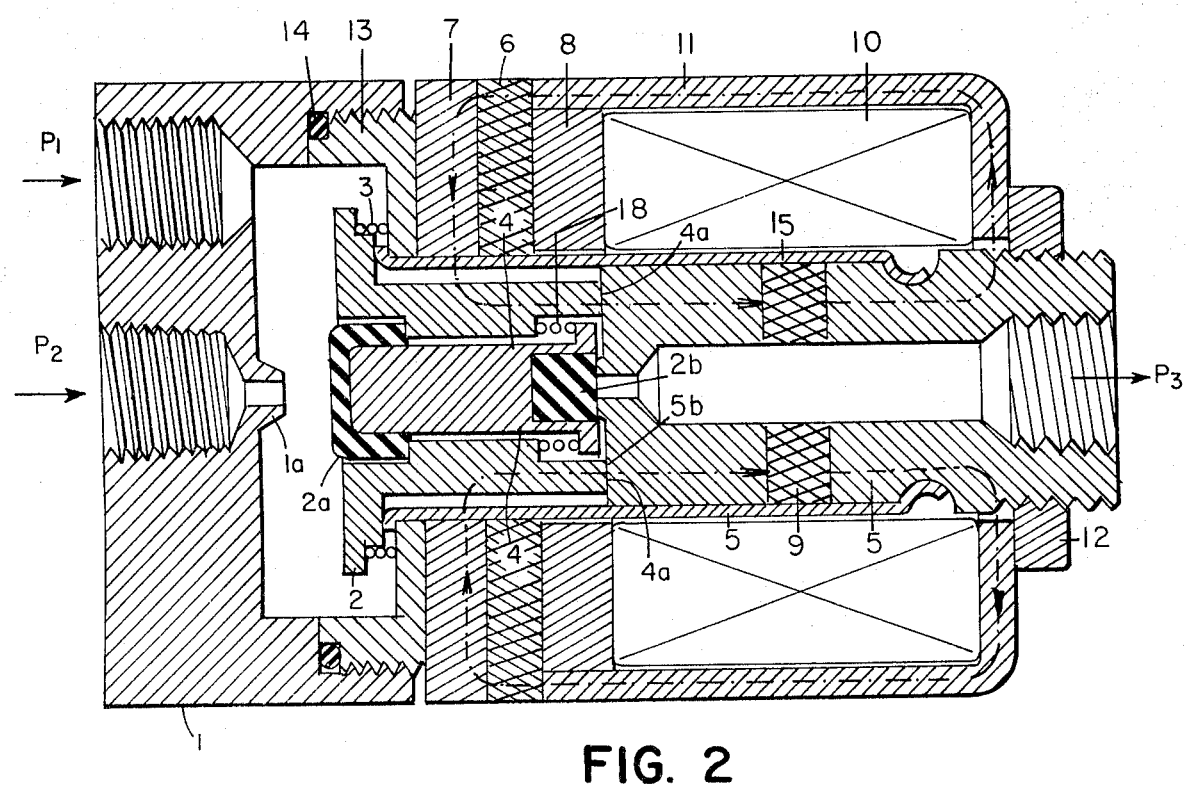
FIG. 2 shows the valve of FIG. 1 in the other of its operating positions, i.e. its open position.

In the open position of the valve which is shown in FIG. 2 valve element 2a has parted from valve seat 1a and valve element 2b engages valve seat 5a.

FIG. 1 shows diagrammatically the magnetic flux path $O_1$ established by first fixed magnet 6 and the magnetic flux path $O_2$ established by second fixed magnet 9. Pole surfaces or pole pieces 4a and 5b are of like polarity and hence do not attract each other which allows helical spring 3 to withdraw plunger 2 and valve element 2b from valve seat 5a. The magnetic fluxes $O_1$ and $O_2$ are separate and parallel as shown in FIG. 1.

The ampere turns of coil 10 are sufficient to reverse the polarity of magnet 9 when coil 10 is energized in opening direction by a direct current, either for a short time, e.g. by a d-c pulse, or for a long time, e.g. by a battery. When coil 10 is thus energized, this results (due to its small coercive force) in a complete demagnetization of magnet 9 and a re-magnetization in the opposite direction as shown in FIG. 2. FIG. 2 also shows that upon changing of the polarity of magnet 9 the flux paths $O_1$ and $O_2$ become serially related. Pole surfaces 4a and 5b have unlike polarities and attract each other against the bias of spring 3 which is compressed. Valve element 2b engages valve seat 5a in the three way arrangement, obstructing the fluid passageway, including exhaust port $P_3$. Fluid is free to pass through ports $P_1$ and $P_2$ in either direction in both the two way and three way arrangement.

The fluid passageway extending from the cavity at the left side of FIGS. 1 and 2 to pole surface 4a, i.e. the fluid passageway along plunger 2, may also be formed by one or several grooves in plunger 2, or by a zone of restricted cross-section extending along plunger 2.

Both magnets 6 and 9 are preferably annular and polarized in such a way that their end surfaces are pole surfaces of opposite polarity. While this is the preferred form of embodying the present invention, magnet 6 may be substituted by one or several bar magnets, and the same applies also to magnet 9.

While I have illustrated a three-way valve as an embodiment of my invention, it will be apparent that the same is applicable to two-way valves, or other valves.

The state of the valve shown in FIG. 1 may also be referred-to as the "de-actuated" state thereof, wherein the pole surfaces 4a, 5b facing each other are of like polarity. The state of the valve shown in FIG. 2 may also be referred-to as the "actuated" state, wherein the pole surfaces 4a,5b facing each other are of opposite polarity due to the action of winding 10 and magnet 9. Magnet 9 is never de-magnetized, but successively re-magnetized in alternate direction.

Parts 2,2a,3,4,5,6,7,8,9,10,11,12,13,14 and 18 are arranged in coaxial relation. The outer diameters of magnet 6 and winding 10 are approximately the same as also the inner diameter of magnet 6 and the inner diameter of winding 10.

If desired a plurality of windings may be substituted in the space for winding 10 as previously noted.

It will be apparent from the above that the closed flux path of magnet 6 in the first position of the flux-shifting valve includes the left pole surface of fixed magnet 6, the first soft iron member 7, pole piece 4a, second soft iron member 8, and back to the other pole surface of first magnet 6. The closed flux path of magnet 9 includes, as shown in FIG. 1, the left pole surface of magnet 9, the left portion of tubular member 5, pole piece 5b, second soft iron member 8, housing or casing 11, the right end of tubular member 5, and back to the other pole surface of magnet 9. It will be apparent from the above that in the position shown in FIG. 1 the flux paths $O_1$ and $O_2$ of magnets 6 and 9 are separate, except for the portion of flux path $O_2$ in the second soft iron member 8 where flux paths $O_1$ and $O_2$ are not separate.

FIG. 2 shows the flux paths of magnets 6 and 9 in series. Then the flux paths of magnets 6 and 9 include a pole surface of magnet 9, the right portion of tubular member 5, housing 11, first magnet 6, first soft iron member 7, the pair of pole pieces 4a,5b, the left portion of tubular member 5, and back to the other pole surface of second magnet 9.

In the position shown in FIG. 1 the valve element 2b is unseated from its valve seat 5a and the flow of fluid extends from the inlet port designated by arrow P₁ to the chamber defined by flanged portion 1, the annular gap formed between part 2 on the one hand and parts 7,6,8 on the other hand, then turns radially inwardly to valve seat 5a, along tubular member 5 to the exit port marked by arrow P₃. The passageway is closed in the position shown in FIG. 2 because the valve element is seated in that position.

I claim as my invention:

1. A magnetic flux-shifting valve having two different positions to control the paths of the flow of a fluid, said valve comprising
   (a) a pair of relatively movable fluid-flow control parts including a valve element and a valve seat cooperating with said valve element;
   (b) means for biasing said valve element away from said valve seat;
   (c) a first fixed permanent magnet having a relatively large coercive force;
   (d) a first soft iron member in physical engagement with one pole surface of said first magnet;
   (e) a second soft iron member in physical engagement with the other pole surface of said first magnet;
   (f) a pair of cooperating pole pieces of soft iron capable of forming a working gap therebetween, said pair of pole pieces including a movable pole piece and a fixed pole piece, said valve element being integral with said movable pole piece and said valve seat being integral with said fixed pole piece;
   (g) said first magnet establishing a first closed flux path in the first position of said flux-shifting valve including one pole surface of said first magnet, said first soft iron member, said movable pole piece, said second soft iron member, and back to the other pole surface of said first magnet;
   (h) a tubular soft iron member defining a fluid passageway jointly with said valve seat;
   (i) a casing of soft iron forming a cavity for housing a flux-shifting electromagnet, said casing extending from the end of said tubular member opposite said fixed pole piece to said first magnet;
   (j) a second fixed permanent magnet having a relatively small coercive force in comparison to said first magnet, said second magnet being supported by said tubular member which forms said fixed pole piece on one end of said second magnet, said second magnet establishing in said first position of said flux-shifting valve a second closed flux path separate from said first flux path except for the portion of said second flux path in said second soft iron member, said second flux path including one pole surface of said second magnet, a portion of said tubular member, said fixed pole piece, said second soft iron member, said casing, another portion of said tubular member, and back to the other pole surface of said second magnet;
   (k) an electromagnet in said casing for reversing the polarity of said second magnet to establish said second fluid control position of said flux-shifting valve wherein the fluxes of said first magnet and said second magnet are in series and the single closed flux path of said first magnet and said second magnet include a pole surface of said second magnet, a portion of said tubular member, said casing, said first magnet substantially excluding said second soft iron member, said first soft iron member, said movable and said fixed pole piece, another portion of said tubular member, and back to the other pole surface of said second magnet; and
   (l) fluid passage means defined by the space between said first magnet and said movable pole piece for admitting fluid to said valve seat when said valve element is separated from said valve seat.

2. A magnetic flux-shifting valve as specified in claim 1 wherein
   (a) said first magnet is annular, the end surfaces thereof are of opposite polarities and the inner diameter of said first magnet exceeds the outer dimensions of said movable pole piece so that said movable pole piece is movable inside said first magnet; and wherein
   (b) said second magnet is annular, arranged in series with and forming a portion of the fluid passageway defined by said tubular member, and the end surfaces thereof are of changeable opposite polarities, the outer diameter of said second magnet and the outer diameter of said tubular member being less than the inner dimensions of said electromagnet and said second magnet and said tubular member are arranged inside of and surrounded by said electromagnet.

3. A magnetic flux-shifting valve including
   (a) a first magnet flux path comprising a first fixed permanent magnet having two pole surfaces and a relatively high coercive force so that the polarity of said first magnet is virtually non-reversible, said first flux path comprising, in addition to said one pole surface of said first magnet, a fixed soft iron member in physical engagement with said one pole surface of said first magnet, a movable pole piece, a second fixed soft iron member in physical engagement with only one portion of the other pole surface of said first magnet, and then back to the other pole surface of said first magnet;
   (b) a second magnetic flux path comprising a second fixed permanent magnet having two pole surfaces and a relatively small coercive force in comparison to the coercive force of said first magnet so that the polarity thereof can be reversed, said second flux path comprising, in addition to one pole surface of said second magnet, a fixed pole piece, said second soft iron member, a housing of soft iron for an electromagnet in physical contact with both said first magnet and said second soft iron member, and back to the other pole surface of said second magnet;
   (c) said movable pole piece and said fixed pole piece being adapted to cooperate with each other;
   (d) said fixed pole piece being tubular, forming a fluid duct and supporting said second magnet;
   (e) an electromagnet winding arranged inside said housing, in coaxial relation to said fixed pole piece and energizable by d-c currents of opposite directions to change the polarity of said second magnet;
   (f) a movable valve element and a cooperating fixed valve seat, said movable valve element being jointly movable with said movable pole piece and said fixed valve seat being arranged at one end of said fluid duct;
   (g) means biasing said movable pole piece away from said fixed pole piece; and (e) means defining a fluid passageway extending along the periphery of said movable pole piece for admitting fluid to said valve seat.

4. A magnetic flux-shifting valve as specified in claim 3 wherein a helical spring is inserted between said movable valve element and said movable pole piece to allow continued moving of said movable pole piece toward said fixed pole piece after said movable valve element has seated upon said fixed valve seat.

5. A magnetic flux-shifting valve as specified in claim 3 wherein said first magnet and said second magnet are both annular, said first magnet has an inner diameter larger than the outer diameter of said second magnet, the end surfaces of said first magnet and said second magnet form the pole surfaces thereof, wherein said electromagnet winding is in the shape of a hollow cylinder of larger inner diameter than the outer diameter of said second magnet, and wherein said first magnet, said second magnet, and said electromagnet winding are arranged in coaxial relation.

6. A magnetic flux-shifting valve as specified in claim 3 wherein said second tubular pole piece is of elongated shape, is sub-divided into two sections, and wherein said second magnet is tubular and inserted between said two sections.

7. A magnetic flux-shifting valve comprising
(a) a first flux path substantially of soft iron;
(b) said first flux path being magnetized by a first permanent fixed magnet having a large coercive force so that the polarity thereof cannot normally be changed;
(c) said first flux path including a first fixed member of soft iron contacting one pole surface of said first magnet, a movable pole piece, and a second fixed member of soft iron contacting the other pole surface of said first magnet;
(d) a second flux path substantially of soft iron;
(e) said second flux path being magnetized by a second permanent fixed magnet having a small coercive force so that the direction of magnetization thereof can be reversed by subjecting said second magnet to a reversing magnetic field;
(f) said second flux path including a fixed pole piece defining a fluid passageway extending in a direction longitudinally thereof, said second fixed member of soft iron, and a casing surrounding said fixed pole piece;
(g) a magnet coil arranged coaxially to said first magnet and said second magnet and adapted to be energized by d-c currents of different directions;
(h) means substantially of soft iron to establish a single flux path when the magnetomotove forces of said first and said second magnet are in series by reversal of the current flow in said magnet coil;
(i) means biasing said movable pole piece away from said fixed pole piece;
(j) a movable valve element supported by said movable pole piece; and
(k) a fixed valve seat cooperating with said movable valve element supported by said fixed pole piece and arranged in coaxial relation with said fluid passageway thereof.

8. A magnetic flux-shifting valve as specified in claim 7 wherein said second fixed member of soft iron is common with said first flux path and said second flux path when said first pole piece and said second pole piece are of the same polarities and a working air gap is established therebetween.

9. A magnetic flux-shifting valve as specified in claim 7 wherein said movable pole piece is provided with a flexible insert forming said valve element and movable against spring bias relative to said movable pole piece, and wherein said movable pole piece defines a substantially cylindrical fluid duct adjacent the outer periphery thereof and leading to said flexible insert.

10. A magnetix flux-shifting valve as specified in claim 7 including a valve base defining two fluid admission ports and further defining a fluid admission chamber housing one of the ends of said movable pole piece, said one of the ends of said movable pole piece controlling the passage of fluid through one of said two fluid admission ports, and said valve base having a first flange portion mating a second flange portion supporting said first and said second magnet and the parts forming said first and second flux paths of said flux-shifting valve.

11. A magnetic flux-shifting valve as specified in claim 7 wherein
(a) said first and said second magnets are annular and magnetized in such a way that the end surfaces thereof form the pole surfaces thereof;
(b) said electromagnet winding is annular and has substantially the same outer diameter as said first magnet;
(c) said first magnet, said second magnet, and said electromagnet winding are arranged coaxially; and wherein
(d) said first magnet and said electromagnet winding have substantially the same inner diameter as the outer diameter of said second magnet.

12. A magnetic flux-shifting valve comprising
(a) a first magnetic flux path comprising a first soft iron section forming a first movable pole piece, said first flux path further comprising a first fixed permanent magnet magnetizing said first pole piece and having such a high coercive force that the polarity of said first pole piece is normally unalterable;
(b) a second magnetic flux path comprising a second soft iron section forming a second fixed pole piece, said second flux path further comprising a second fixed permanent magnet magnetizing said second pole piece and having such a low coercive force that the polarity of said second magnet is normally alterable;
(c) a tubular soft iron member integral with said second pole piece forming a fluid passageway and forming also part of said second magnetic flux path;
(d) a winding arranged in coaxial relation to said tubular member adapted to be selectively energized in opposite directions and thereby to overcome the low coercive force of said second magnet so that the polarity of said second magnet and said second pole piece can be changed by reversing the direction of current flow in said winding;
(e) a housing of soft iron for said winding for completing said second flux path; and
(f) a pole surface of said first magnet relatively remote from said second magnet being covered by a first soft iron member, and the other pole surface of said first magnet relatively close to said second magnet being covered by a second soft iron member, said first soft iron member and said second soft iron member forming a portion of said first flux path and a portion of said second flux path when said first pole piece and said second pole piece are of equal polarity, and said second soft iron member lying substantially outside said first flux path and outside said second flux path when said first pole piece and said second pole piece are of unequal polarity.

13. A magnetic flux-shifting valve having two positions and combined with means for opening or closing a fluid passageway comprising
   (a) a first closed flux path substantially of soft iron occurring in one of said two positions;
   (b) a second closed flux path substantially of soft iron also occurring in said one of said two positions;
   (c) said first flux path being magnetized by a first fixed permanent magnet having a large coercive force so that the polarity thereof cannot normally be changed, and said first flux path including in addition to said first fixed magnet a first fixed member of soft iron arranged to one side of said first magnet, a pole piece movable along a straight line, and a second fixed member of soft iron arranged to the other side of said first magnet;
   (d) said second flux path being magnetized by a second fixed permanent magnet extending in a direction longitudinally of said first fixed magnet and having a small coercive force so that the polarity thereof can be reversed by a magnetic field; and
   (e) a fixed electromagnet energizable by reversible d-c currents arranged in coaxial relation to said first magnet and said second magnet to change the direction of magnetization of said second magnet and thereby to cause said first magnet and said second magnet to establish magnetomotive forces in series and a third closed flux path different from said first flux path and said second flux path.

14. In a flux-shifting valve as specified in claim 13 wherein said first magnet and said second magnet are both annular, wherein said first magnet has an inner diameter exceeding the outer diameter of said second magnet, wherein a movable valve element is supported by a movable pole piece, wherein a fixed valve seat cooperates with said movable valve element and is supported by a fixed pole piece, and wherein said fixed pole piece defines a straight tubular passageway to allow a flow of fluid to take place from said fixed valve seat in a direction longitudinally of said fixed pole piece.

15. In a magnetic flux-shifting valve the combination of
   (a) a tubular fixed armature substantially of soft iron defining a fluid passageway;
   (b) a plunger movable relative to said armature to open and close said fluid passageway;
   (c) said plunger having a first position in which a gap is formed between said plunger and said armature and said plunger having a second position in which said gap between said plunger and said armature is closed;
   (d) means for biasing said plunger away from said armature to establish said gap;
   (e) means for admitting a fluid to said gap against the action of said biasing means;
   (f) a housing for an electromagnet surrounding said armature and having a wall of soft iron;
   (g) a first fixed permanent magnet abutting against said housing wall and having a relatively high coercive force so that the polarization thereof is normally unalterable;
   (h) a second fixed permanent magnet having a relatively low coercive force so that the polarization thereof is normally alterable, said second magnet being displaced relative to said first magnet in a direction longitudinally of said armature;
   (i) a first soft iron member engaging one side of said first magnet, said first magnet and said first soft iron member both being disk-shaped and both having the same diameter;
   (j) a second soft iron member engaging the other side of said first magnet and being disk-shaped and having a smaller diameter than said first soft iron member, and being overlapped by said housing wall;
   (k) a first flux path including said first soft iron member, said plunger, said second soft iron member and said first magnet;
   (m) a second flux path including a portion of said armature, said second soft iron member, said wall of said housing for an electromagnet, and said second magnet; and
   (n) an electromagnet in said housing adapted to reverse the polarity of said second magnet to establish a third flux path, the magnetomotorive forces active in said third flux path resulting in closing of said gap.

16. A magnetic flux-shifting valve including
   (a) a substantially straight tubular armature defining a fluid passageway having an intake end and an outlet end;
   (b) a plunger movable relative to said intake end to open and close said fluid passageway;
   (c) means for biasing said plunger away from said intake end;
   (d) means for admitting fluid to said intake end;
   (e) a housing for an electromagnet surrounding said armature, said housing having a wall of soft iron;
   (f) a first fixed permanent magnet having a relatively high coercive force so that the polarization thereof is virtually unalterable;
   (g) a second fixed permanent magnet having a relatively low coercive force so that the polarization thereof is alterable;
   (h) a first soft iron member arranged to one side of said first magnet in physical contact with it;
   (i) a second soft iron member arranged to the other side of said first magnet in physical contact with it;
   (j) said wall of said housing for an electromagnet overlapping said second fixed soft iron member and abutting against said first magnet;
   (k) a first flux path including said first soft iron member, said plunger, said second soft iron member and said first magnet;
   (l) a second flux path including said armature, said second soft iron member, said wall of said housing for an electromagnet, and said second magnet; and
   (m) an electromagnet in said housing adapted to reverse the polarity of said magnet, causing attraction of said plunger and closing of said fluid passageway.

17. A magnetic flux-shifting valve as specified in claim 16 wherein said second magnet is tubular and arranged between the input end and the output end of said armature.

* * * * *